United States Patent

(12) United States Patent
Fukushi

(10) Patent No.: US 11,474,922 B2
(45) Date of Patent: Oct. 18, 2022

(54) FAULT CONTENT IDENTIFICATION DEVICE, FAULT CONTENT IDENTIFICATION METHOD, AND RECORDING MEDIUM IN WHICH FAULT CONTENT IDENTIFICATION PROGRAM IS STORED

(71) Applicant: NEC Platforms, Ltd., Kawasaki (JP)

(72) Inventor: Toru Fukushi, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 895 days.

(21) Appl. No.: 16/316,101

(22) PCT Filed: Jul. 20, 2017

(86) PCT No.: PCT/JP2017/026194
§ 371 (c)(1),
(2) Date: Jan. 8, 2019

(87) PCT Pub. No.: WO2018/016554
PCT Pub. Date: Jan. 25, 2018

(65) Prior Publication Data
US 2021/0279158 A1 Sep. 9, 2021

(30) Foreign Application Priority Data
Jul. 21, 2016 (JP) .............................. JP2016-143478

(51) Int. Cl.
G06F 11/00 (2006.01)
G06F 11/30 (2006.01)
(Continued)

(52) U.S. Cl.
CPC ............ *G06F 11/3058* (2013.01); *G06F 1/30* (2013.01); *G06F 11/0772* (2013.01); *G06F 11/325* (2013.01)

(58) Field of Classification Search
CPC .......... G06F 11/3058; G06F 1/30; G06F 1/28; G06F 1/26
See application file for complete search history.

(56) References Cited

U.S. PATENT DOCUMENTS 5,019,717 A * 5/1991 McCurry ................ H02J 9/061
307/66
2004/0217651 A1 * 11/2004 Brown ..................... H02M 1/36
307/31
(Continued)

FOREIGN PATENT DOCUMENTS

JP H10-312229 A 11/1998
JP H11-83945 A 3/1999
(Continued)

OTHER PUBLICATIONS

International Search Report for PCT Application No. PCT/JP2017/026194, dated Sep. 12, 2017.
(Continued)

Primary Examiner — Amine Riad
(74) Attorney, Agent, or Firm — Sughrue Mion, PLLC

(57) ABSTRACT

A fault content identification device 40 identifies details of a fault of a power supply control system in a short time by including: a detection unit 41 which, while a power supply control processing for turning on or turning off a power supply device 60 that supplies power to a main device 50 is in progress, detects that a value indicated by a power supply sequence signal generated by the main device 50 or the power supply device 60 and having a value that transitions in accordance with a prescribed specification, transitions to a value indicating non-conformance to the prescribed specification; and a generation unit 42 for generating information that indicates details of the power supply control processing performed at a timing when the detection unit 41 detects that
(Continued)

the value indicated by the power supply sequence signal transitions to the value indicating non-conformance to the prescribed specification.

10 Claims, 7 Drawing Sheets

(51) Int. Cl.
*G06F 1/30* (2006.01)
*G06F 11/07* (2006.01)
*G06F 11/32* (2006.01)

(56) References Cited

U.S. PATENT DOCUMENTS

| | | | |
|---|---|---|---|
| 2004/0217749 A1* | 11/2004 | Orr | H02M 3/33569 |
| | | | 323/299 |
| 2004/0217750 A1* | 11/2004 | Brown | G06F 1/263 |
| | | | 323/299 |
| 2005/0240814 A1* | 10/2005 | Sasakura | G01R 31/31721 |
| | | | 714/14 |
| 2007/0016313 A1* | 1/2007 | Abe | G05B 23/0237 |
| | | | 700/22 |
| 2007/0260918 A1 | 11/2007 | Okada et al. | |
| 2009/0144571 A1 | 6/2009 | Tatsumi | |
| 2009/0158057 A1* | 6/2009 | Begun | G06F 1/26 |
| | | | 713/300 |
| 2009/0158071 A1* | 6/2009 | Ooi | G06F 11/30 |
| | | | 713/340 |
| 2011/0267004 A1* | 11/2011 | Krauer | B60L 1/08 |
| | | | 320/109 |
| 2017/0243540 A1* | 8/2017 | Liu | G09G 3/3258 |

FOREIGN PATENT DOCUMENTS

| | | |
|---|---|---|
| JP | 2000-172525 A | 6/2000 |
| JP | 2000-188829 A | 7/2000 |
| JP | 2007-286937 A | 11/2007 |
| JP | 2009-134576 A | 6/2009 |

OTHER PUBLICATIONS

English translation of Written opinion for PCT Application No. PCT/JP2017/026194.

* cited by examiner

| STATE OF VALUES TO BE INPUT | OUTPUT Q | OUTPUT L | OUTPUT S |
|---|---|---|---|
| X=Y | 1 | 0 | 0 |
| X>Y | 0 | 1 | 0 |
| X<Y | 0 | 0 | 1 |

140 SUSPECTED-FAULT DICTIONARY INFORMATION

| NUMERICAL VALUE OBTAINED BY DECODING BY DECODE CIRCUIT 120 | SUSPECTED COMPONENT |
|---|---|
| 1 | COMPONENT A, COMPONENT B |
| 2 | COMPONENT B, COMPONENT C, COMPONENT D |
| 3 | COMPONENT D, COMPONENT E |
| 4 | COMPONENT F, COMPONENT G |
| 5 | COMPONENT F, COMPONENT H, COMPONENT I |

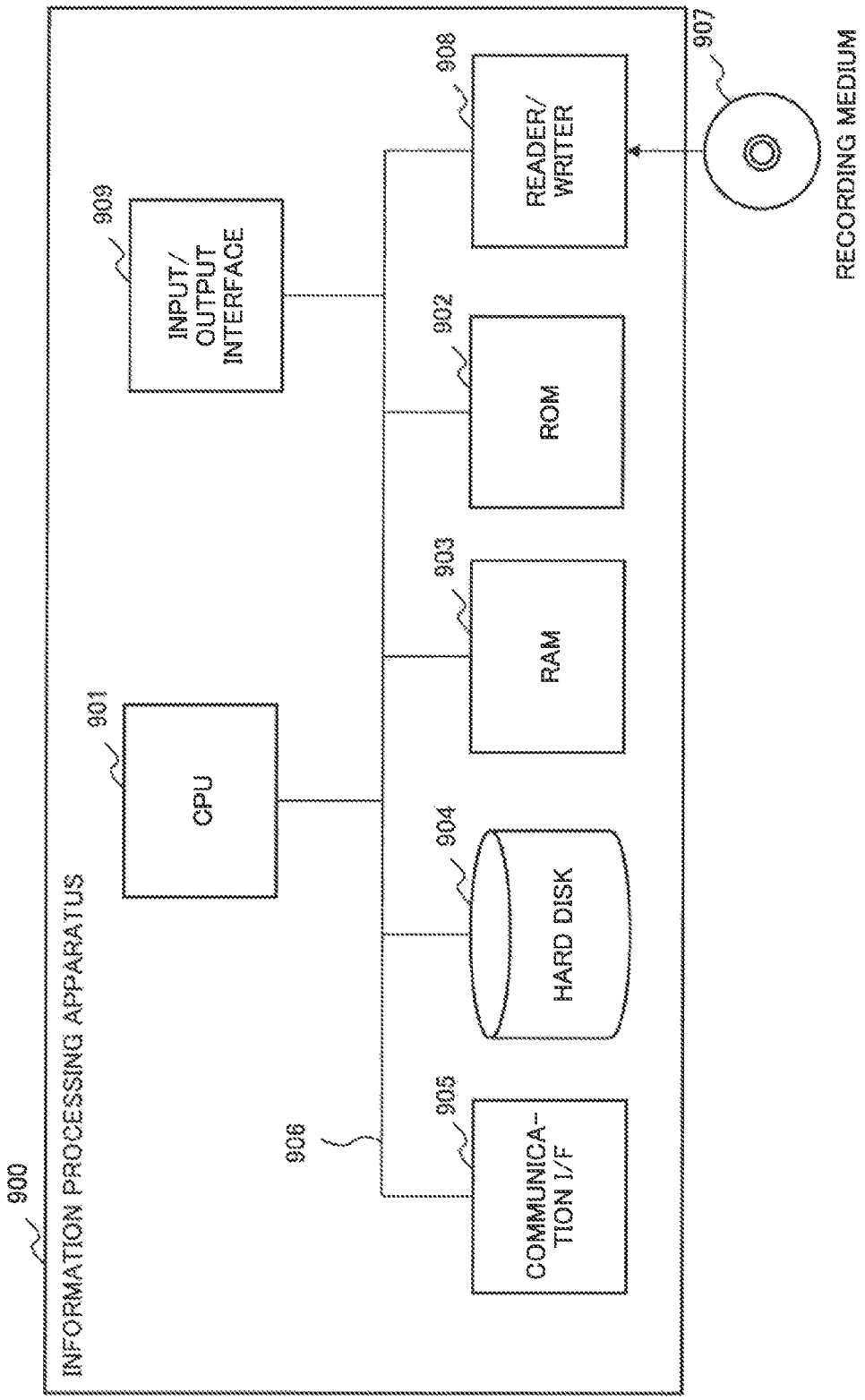

FAULT CONTENT IDENTIFICATION DEVICE, FAULT CONTENT IDENTIFICATION METHOD, AND RECORDING MEDIUM IN WHICH FAULT CONTENT IDENTIFICATION PROGRAM IS STORED

This application is a National Stage Entry of PCT/JP2017/026194 filed on Jul. 20, 2017, which claims priority from Japanese Patent Application 2016-143478 filed on Jul. 21, 2016, the contents of all of which are incorporated herein by reference, in their entirety.

TECHNICAL FIELD

The present invention relates to a technique for identifying details of a fault related to a power supply control system of an apparatus.

BACKGROUND ART

In modern society where informatization is highly advanced, effect of a fault occurring in an information processing system on the society is significant. Thus, an expectation has been increasing for a technique for appropriately detecting a fault occurring in an information processing system and identifying details of the fault.

As a technique related to such a technique, PTL 1 discloses a power supply control device that detects, in an apparatus requiring a plurality of powers for which units of control are different, an abnormality in power supply sequence of a unit receiving supply of power. This device controls supply and interruption of power to a plurality of power supply devices for supplying power and those power supply devices. The device measures a period of time from when any one of the power supply devices starts supply of power until other power supply devices start supply of power, and detects an abnormality in power supply sequence on the basis of the measurement result.

PTL 2 discloses a fault notification device for identifying a position where a fault has occurred in an information processing apparatus before initial diagnosis. The device monitors a reset sequence by inputting a plurality of reset signals to a CPU (Central Processing Unit) and an IO (Input/Output) controller. The device monitors a bus sequence by inputting a plurality of bus signals to a plurality of busses connected to the CPU. The device generates a first discrimination signal associated with the plurality of reset signals and a second discrimination signal associated with the plurality of bus signals. The device then notifies a position of the fault by a sound or a blinking signal by adding the discrimination signals to the plurality of reset signals and the plurality of bus signals and outputting resultant signals.

PTL 3 discloses a device for supplying power, using a power supply sequence signal, to a plurality of power domains in an optimal power supply sequence.

PTL 4 discloses a failure diagnosis method for reducing time required for failure simulation by reducing a resource for storage capacity required to generate a failure dictionary and narrowing down target failures.

CITATION LIST

Patent Literature

[PTL 1] JP H10(1998)-312229 A
[PTL 2] JP 2000-172525 A
[PTL 3] JP 2009-134576 A
[PTL 4] JP H11(1999)-83945 A

SUMMARY OF INVENTION

Technical Problem

When a hardware fault occurs upon turning an information processing apparatus on or off, the hardware or software often cannot generate a log indicating a cause of the fault. In such a case, in order to identify the cause of the fault, it is commonly practiced to analyze details of the fault by connecting a physical wiring to a printed circuit board in such a way that a power supply sequence signal, for example, is able to be observed and subsequently observing, using an observational instrument such as a logic analyzer, a power supply sequence signal or the like. In this case, repeated confirmation is required by replacing a suspected component for the fault and reproducing the fault; in addition, since reproduction of a fault often depends on an environment or a configuration of an information processing system, there is a problem in that identification of a faulty component requires a lot of time. Configurations disclosed in PTLs 1 to 4 are less than satisfactory for solving this problem. An object of the present invention is to provide a fault content identification device and the like for solving this problem.

Solution to Problem

A fault content identification device according to one aspect of the present invention includes: a detection means for detecting, while a power supply control processing for turning on or off a power supply device that supplies power to a main device is in progress, that a value indicated by a power supply sequence signal generated by the main device or the power supply device and having a value that transitions in accordance with a prescribed specification, transitions to a value indicating non-conformance to the prescribed specification; and a generation means for generating information indicating details of the power supply control processing performed at a timing at which the detection means detects that the value indicated by the power supply sequence signal transitions to the value indicating non-conformance to the prescribed specification.

In another perspective for achieving the aforementioned object, a fault content identification method according to one aspect of the present invention is implemented by an information processing apparatus and includes: detecting, while a power supply control processing for turning on or off a power supply device that supplies power to a main device is in progress, that a value indicated by a power supply sequence signal generated by the main device or the power supply device and having a value that transitions in accordance with a prescribed specification, transitions to a value indicating non-conformance to the prescribed specification; and generating information indicating details of the power supply control processing performed at a timing at which it is detected that the detected value indicated by the power supply sequence signal transitions to the value indicating non-conformance to the prescribed specification.

In yet another perspective for achieving the aforementioned object, a fault content identification program according to one aspect of the present invention is a program that causes a computer to execute: a detection processing of detecting, while a power supply control processing for turning on or off a power supply device that supplies power to a main device is in progress, that a value indicated by a power supply sequence signal generated by the main device or the power supply device and having a value that transitions in accordance with a prescribed specification, transitions to a value indicating non-conformance to the prescribed specification; and a generation processing of generating information indicating details of the power supply control processing performed at a timing at which it is detected, in the detection processing, that the value indicated by the power supply sequence signal transitions to the value indicating non-conformance to the prescribed specification.

The present invention may be achieved by a non-volatile computer-readable recording medium storing a fault content identification program (computer program) according to the present invention.

Advantageous Effects of Invention

The present invention is able to identify, in a short time, details of a fault of a power supply control system with respect to a processing of turning a device on or off.

BRIEF DESCRIPTION OF DRAWINGS

FIG. 8 is a block diagram illustrating a configuration of an information processing apparatus that may implement the fault content identification device according to each example embodiment of the present invention.

EXAMPLE EMBODIMENT

Hereinafter, example embodiments of the present invention will be described in detail with reference to drawings.

First Example Embodiment

Figure 1:
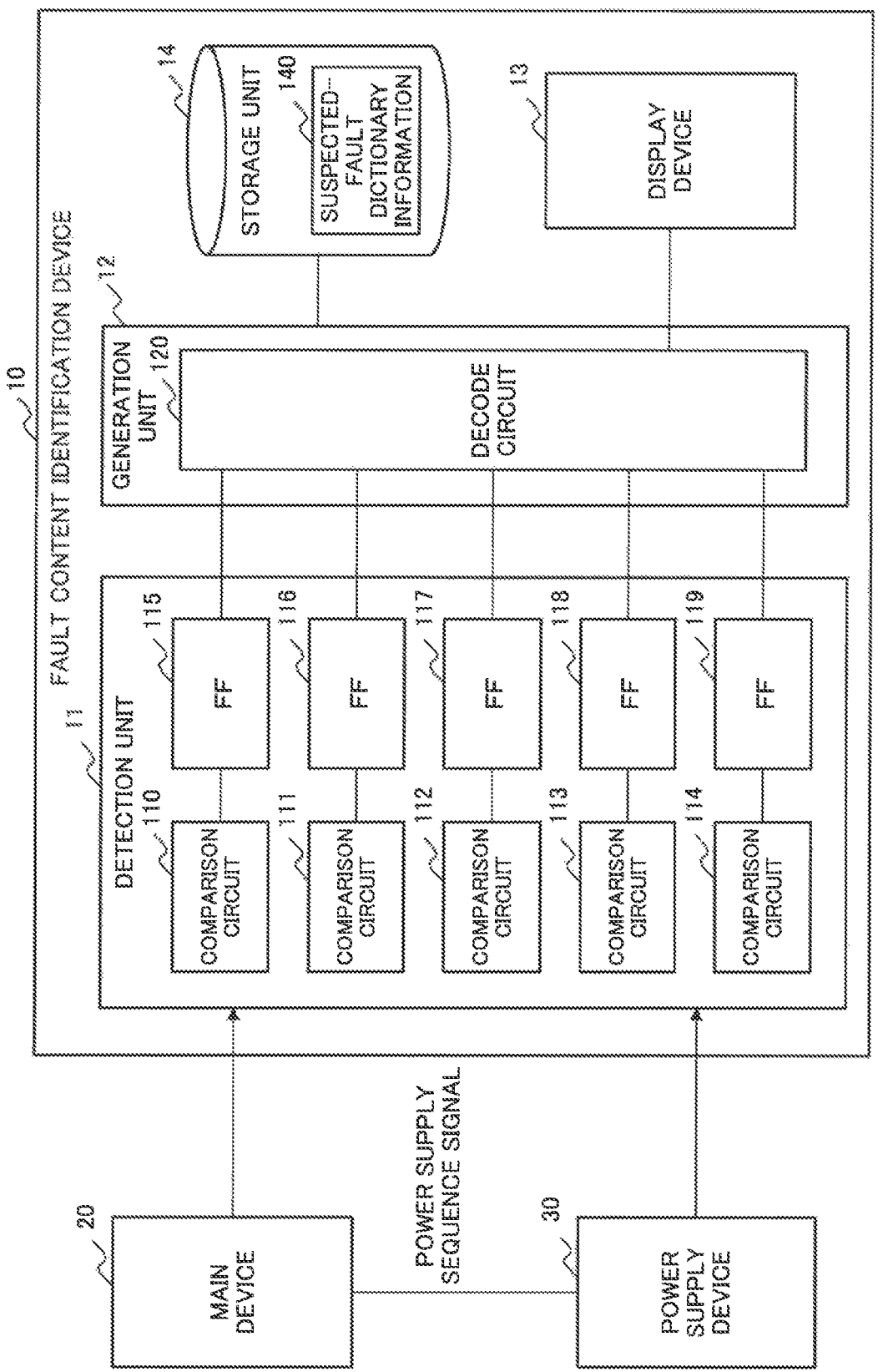
FIG. 1 is a block diagram illustrating a configuration of a fault content identification device 10 according to a first example embodiment of the present invention.

FIG. 1 is a block diagram conceptually illustrating a configuration of a fault content identification device 10 according to a first example embodiment of the present invention. The fault content identification device 10 is a device for identifying (determining, diagnosing), for example, when a power supply device 30 for supplying power to a main device 20, which is an information processing apparatus, is turned on or off, details of a fault that has occurred by observing a power supply sequence (power sequence) signal transmitted/received between the main device 20 and the power supply device 30. The fault content identification device 10 may be an independent device or a device included in the main device 20 or the power supply device 30.

Each of the aforementioned power supply sequence signals is, similarly to, for example, a configuration described in PTL 3, a signal generated by the main device 20 or the power supply device 30 and having a value that changes at a prescribed timing (the value that transitions in accordance with a prescribed specification) while a power supply control processing for turning on or off the power supply device 30 is in progress. The power supply sequence signal may be a signal indicating a state in which the power supply control processing is in progress, for example, detection of an operation of a switch by a user for turning the power supply device 30 on or off, start or completion of a specific partial processing included in the power supply control processing, or the like.

Figure 2:
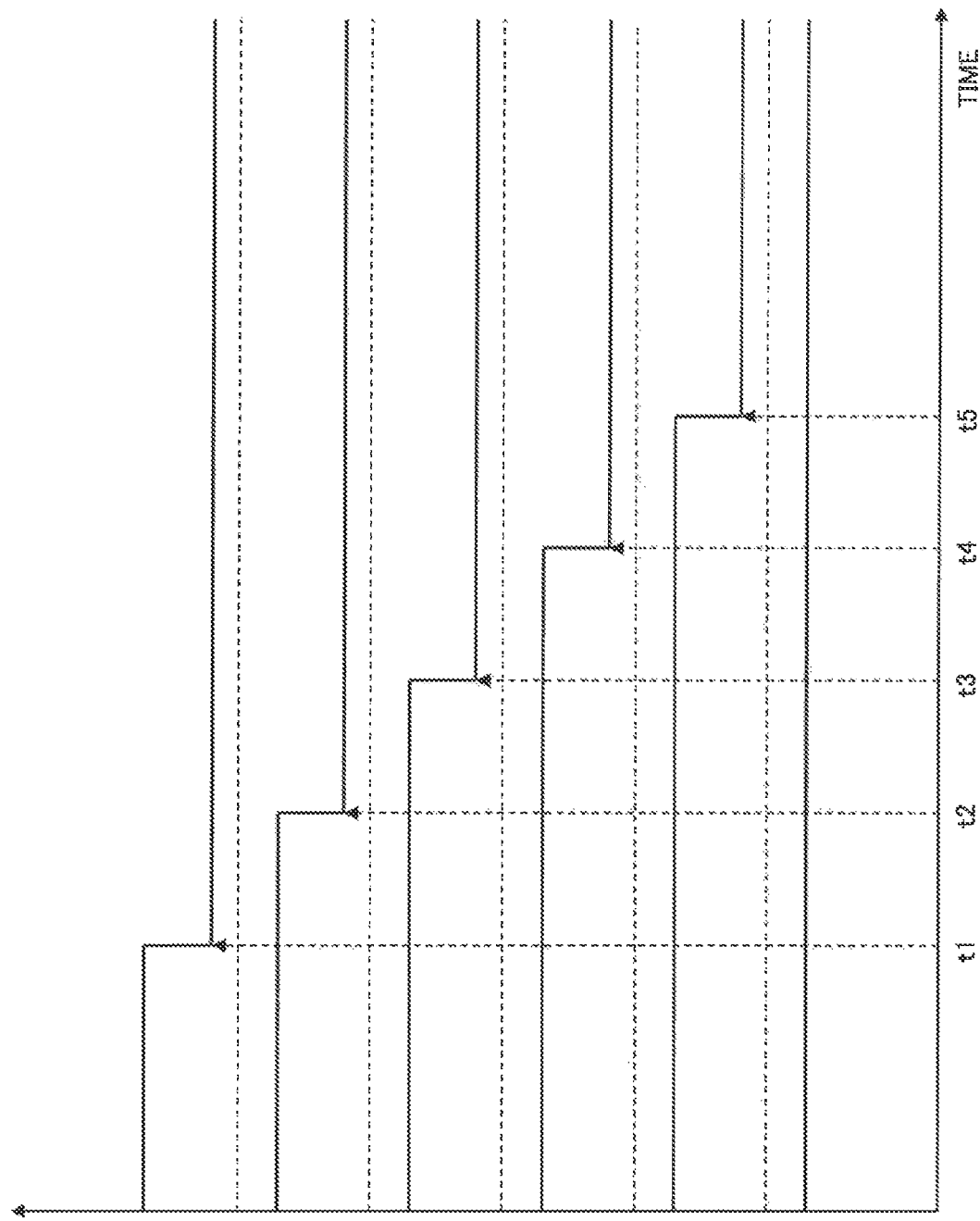
FIG. 2 is a timing diagram exemplifying a normal temporal transition of values indicated by a power supply sequence signals when a power supply device 30 according to the first example embodiment of the present invention is turned off.

FIG. 2 is a timing diagram exemplifying a normal temporal transition of values indicated by the power supply sequence signals when the power supply device 30 according to the present example embodiment is turned off. In the present application, while an operation of the fault content identification device 10 when the power supply device 30 is turned off will be described below, it is assumed that the operation of the fault content identification device 10 when the power supply device 30 is turned on is similar to that in the case where the power supply device 30 is turned off.

In the present example embodiment, as illustrated in FIG. 2, it is assumed that, as power supply sequence signals, at least six signals, i.e., "P-SW", "PLT-RST", "PS-ON", "PWR-GD", "PS-POWOK", and "STBY" are transmitted/received between the main device 20 and the power supply device 30. In the present example embodiment, signals transmitted/received as power supply sequence signals are not limited to these six signals.

In FIG. 2, the signal "P-SW" is a signal indicating an on/off state of a power switch, and indicates that an operation for turning off the power for the power switch is performed at time t1 by a user. In FIG. 2, the signal "STBY" is a signal indicating that the power supply device 30 is externally supplied with AC (Alternating Current). In FIG. 2, the signal "PLT-RST", the signal "PS-ON", the signal "PWR-GD", and the signal "PS-POWOK" are signals used in the power supply control processing. Each value of the signal "PLT-RST", the signal "PS-ON", the signal "PWR-GD", and the signal "PS-POWOK" transitions from "1" to "0" at a prescribed timing (for example, a timing at which a partial processing is started or completed).

As illustrated in FIG. 2, it is assumed, when the power supply control processing for turning off the power supply device 30 according to the present example embodiment is normally performed, the values of the signal "P-SW", the signal "PLT-RST", the signal "PS-ON", the signal "PWR-GD", and the signal "PS-POWOK" respectively transition from "1" to "0" at times t1 to t5 (t1<t2<t3<t4<t5) in accordance with the power specifications. It is assumed that the signal "STBY" keeps "1" unless the AC supply to the power supply device 30 is interrupted. Therefore, the fault content identification device 10 according to the present example embodiment is able to detect occurrence of a fault by detecting a state violating power specifications, such as a state in which "a value indicated by a signal A>a value indicated by a signal B" holds when it is assumed that a signal having a value that transitions from "1" to "0" at time to and a signal having a value that transitions from "1" to "0" at time t(n+1) are respectively referred to as the signal A and the signal B, where n is an integer and one of 1 to 4.

As illustrated FIG. 1, the fault content identification device 10 according to the present example embodiment includes a detection unit 11, a generation unit 12, a display device 13, and a storage unit 14. The detection unit 11 and the generation unit 12 may be constructed with a programmable logic circuit, for example, a PLD (Programmable Logic Device), or may be constructed with a general logic circuit having a fixed logic. It is assumed that, for example, when the power supply device 30 shifts to a power standby state in which the power supply device 30 is externally supplied with AC, the fault content identification device 10 starts operation and resets an internal condition to an initial state upon starting the operation.

The detection unit 11 includes comparison circuits 110 to 114 and FFs (flip-flops) 115 to 119 inside. The configurations and the functions of the comparison circuits 110 to 114 are equal. The configurations and the functions of the FFs 115 to 119 are equal. To the FFs 115 to 119, a clock signal (not illustrated in FIG. 1) is input.

Figure 3:
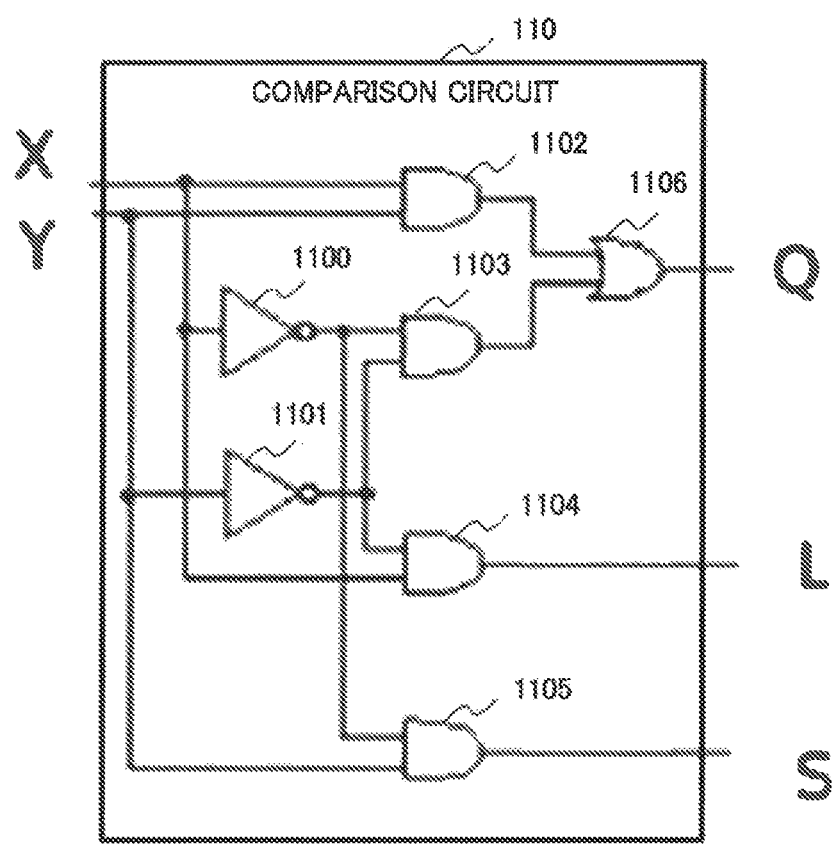
FIG. 3 is a diagram exemplifying a configuration of a comparison circuit 110 according to the first example embodiment of the present invention.

FIG. 3 is a diagram exemplifying a configuration of the comparison circuit 110 according to the present example embodiment. The comparison circuit 110 includes NOT gates 1100 and 1101, AND gates 1102 to 1105, and an OR gate 1106, and is a circuit in which these gates are connected as illustrated in FIG. 3. Note that "NOT" represents logical NOT, "AND" represents logical AND, and "OR" represents logical OR. The comparison circuit 110 also includes, as input/output, input X, input Y, output Q, output L, and output S.

Figures 4, 5:
FIG. 4 is a diagram exemplifying a relationship between values input to the comparison circuit 110 according to the first example embodiment of the present invention and values output from the comparison circuit 110.
FIG. 5 is a diagram exemplifying a configuration of a suspected-fault dictionary information 140 according to the first example embodiment of the present invention.

FIG. 4 is a diagram exemplifying a relationship between values input to the comparison circuit 110 exemplified in FIG. 3 and values output from the comparison circuit 110. As exemplified in FIG. 4, when values satisfying "X=Y" (i.e., both X and Y are "0" or "1") are input to the input X and the input Y in the comparison circuit 110, values output from the output Q, the output L, and the output S are respectively "1", "0", and "0". When values satisfying "X>Y" (i.e., X is "1" and Y is "0") are input to the input X and the input Y in the comparison circuit 110, values output from the output Q, the output L, and the output S are respectively "0", "1", and "0". When values satisfying "X<Y" (i.e., X is "0" and Y is "1") are input to the input X and the input Y in the comparison circuit 110, values output from the output Q, the output L, and the output S are respectively "0", "0", and "1".

To the input X and the input Y in the comparison circuit 110 according to the present example embodiment, the signal "P-SW" and the signal "PLT_RST" exemplified in FIG. 2 are respectively input. To the input X and the input Y in the comparison circuit 111, the signal "PLT_RST" and the signal "PS_ON" exemplified in FIG. 2 are respectively input. To the input X and the input Y in the comparison circuit 112, the signal "PS_ON" and the signal "PWR_GD" exemplified in FIG. 2 are respectively input. To the input X and the input Y in the comparison circuit 113, the signal "PWR_GD" and the signal "PS_POWOK" exemplified in FIG. 2 are respectively input. To the input X and the input Y in the comparison circuit 114, the signal "PS_POWOK" and the signal STBY" exemplified in FIG. 2 are respectively input.

The comparison circuit 110 inputs the output L illustrated in FIG. 3 to the FF 115 illustrated in FIG. 1. The comparison circuit 111 inputs the output L to the FF 116. The comparison circuit 112 inputs the output L to the FF 117. The comparison circuit 113 inputs the output L to the FF 118. The comparison circuit 114 inputs the output L to the FF 119.

When a value indicated by the signal input from the comparison circuit 110 is 0", the FF 115 according to the present example embodiment inputs 0" to the generation unit 12. When the value indicated by the signal input from the comparison circuit 110 transitions from "0" to "1", the FF 115 changes the value to be input to the generation unit 12 from "0" to "1", and thereafter keeps the state in which "1" is input to the generation unit 12. In other words, when there is generated a state violating the power specifications such as a state in which the value indicated by the signal "P-SW" is "1" and the value indicated by the signal "PLT_RST" is "0", the FF 115 continuously inputs "1" to the generation unit 12. Such operation is able to be achieved, for example, by a configuration in which the output from the OR gate (not illustrated in FIG. 1), to which the output from the FF 115 and the output from the comparison circuit 110 are input, is input to the FF 115.

Similarly, when there is generated a state violating the power specifications such as a state in which the value indicated by the signal "PLT_RST" is "1" and the value indicated by the signal "PS_ON" is "0", the FF 116 continuously inputs "1" to the generation unit 12. When there is generated a state violating the power specifications such as a state in which the value indicated by the signal "PS_ON" is "1" and the value indicated by the signal "PWR_GD" is "0", the FF 117 continuously inputs "1" to the generation unit 12. When there is generated a state violating the power specifications such as a state in which the value indicated by the signal "PWR_GD" is "1" and the value indicated by the signal "PS_POWOK" is "0", the FF 118 continuously inputs "1" to the generation unit 12. When there is generated a state violating the power specifications such as a state in which the value indicated by the signal "PS_POWOK" is "1" and the value indicated by the signal "STBY" is "0", the FF 119 continuously inputs "1" to the generation unit 12. As illustrated in FIG. 1, the generation unit 12 according to the present example embodiment includes a decode circuit 120 inside. The decode circuit 120 generates a numerical value obtained by decoding the value input from the FFs 115 to 119. The decode circuit 120 generates, for example, "1" as a decoded numerical value when "1" is input from the FF 115. The decode circuit 120 generates, for example, "2" as the decoded numerical value when "1" is input from the FF 116. The decode circuit 120 generates, for example, "3" as the decoded numerical value when "1" is input from the FF 117. The decode circuit 120 generates, for example, "4" as the decoded numerical value when "1" is input from the FF 118. The decode circuit 120 generates, for example, "5" as the decoded numerical value when "1" is input from the FF 119. The decode circuit 120 generates, for example, "0" as the decoded numerical value when all values input from the FFs 115 to 119 are "0" (i.e., a state violating the power specifications is not generated).

The decode circuit 120 displays the decoded numerical value, for example, on the display device 13. The display device 13 is a device that can display characters and numbers, for example, an LCD monitor.

The generation unit 12 may display, on the display device 13, information indicating a suspected component with respect to the fault that has occurred, the information obtained by matching the decoded numerical value with the suspected-fault dictionary information 140 stored in the storage unit 14. The storage unit 14 is a storage device such as an electronic memory or a magnetic disk. The suspected-fault dictionary information 140 is information stored in the storage unit 14, for example, by a user.

FIG. 5 is a diagram exemplifying a configuration of a suspected-fault dictionary information 140 according to the present example embodiment. As exemplified in FIG. 5, the suspected-fault dictionary information 140 is information that associates the numerical value obtained by decoding by the decode circuit 120 with the suspected component with respect to the fault that has occurred. For example, when the numerical value obtained by decoding by the decode circuit 120 is "1", in other words, when the values indicated by the signal "P-SW" and the signal "PLT_RST" are values that violate the power specifications, the suspected-fault dictionary information 140 exemplified in FIG. 5 indicates that the suspected components are "component A" and "component B".

The suspected-fault dictionary information 140 is, as commonly practiced in, for example, generation of a fault dictionary, information generated by a user on the basis of an analysis result with respect to the fault that has occurred in the past. For example, it is assumed that, when a user analyzes the fault that has occurred in the past by means of an observational instrument, it is found out that the timings at which the values of the signal "P-SW" and the signal "PLT_RST" change are reversed compared with the normal timings illustrated in FIG. 2 (in other words, it corresponds to a case where the value obtained by decoding by the decode circuit 120 is "1"). It is also assumed that, as a result of analyzing the fault that has generated such condition, there exist cases, i.e., a case where failure of the component A is found out and a case where failure of the component B is found out. In this case, as exemplified in FIG. 5, the component A and the component B are registered in the suspected-fault dictionary information 140 as the suspected components in the case where the value obtained by decoding by the decode circuit 120 is "1". This results from, for example, that the components involved in generation of the signal "P-SW" and the signal "PLT_RST" are the "component A" and the "component B" included in the main device 20 or the power supply device 30.

Figure 6:
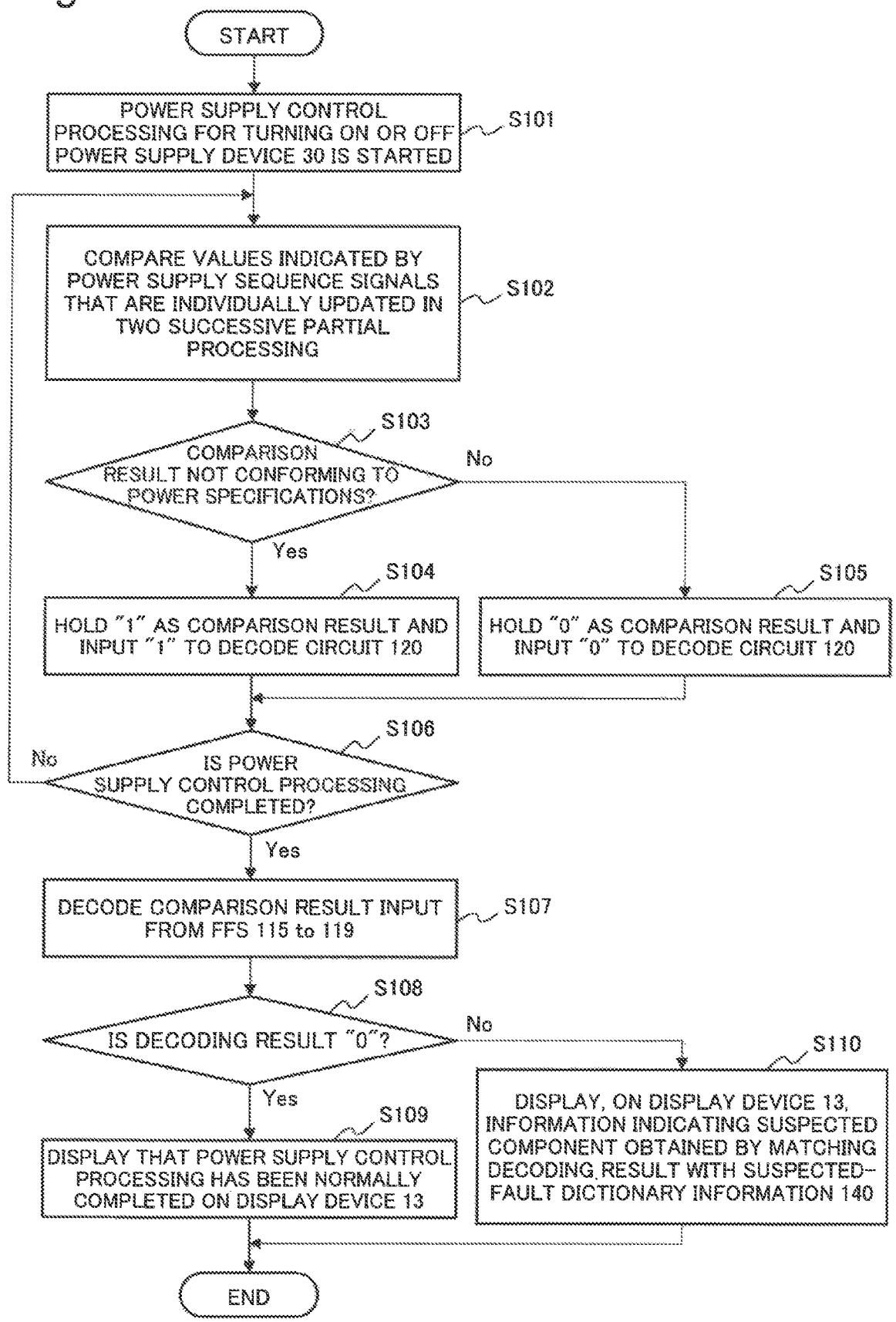
FIG. 6 is a flowchart illustrating an operation of the fault content identification device 10 according to the first example embodiment of the present invention.

Next, the operation (processing) of the fault content identification device 10 according to the present example embodiment will be described in detail with reference to a flowchart in FIG. 6.

With an operation by a user or the like, the power supply control processing for turning on or off the power supply device 30 is started (step S101). The comparison circuits 110 to 114 in the detection unit 11 compare the values indicated by the power supply sequence signals that are individually updated in the two successive partial processing (step S102).

When the comparison result does not conform to the power specifications (Yes in step S103), the FFs 115 to 119 in the detection unit 11 holds "1" input from the comparison circuits 110 to 114 and inputs the value to the decode circuit 120 (step S104). When the comparison result conforms to the power specifications (No in step S103), the FFs 115 to 119 holds "0" input from the comparison circuits 110 to 114 and inputs the value to the decode circuit 120 (step S104).

When the power supply control processing is not completed (No in step S106), the processing returns to step S102. When the power supply control processing is completed (Yes in step S106), the processing proceeds to step S107.

The decode circuit 120 in the generation unit 12 decodes the comparison result input from the FFs 115 to 119 (step S107). When the result of decoding is "0" (Yes in step S108), the generation unit 12 displays characters, numbers and the like indicating that the power supply control processing has been normally completed on the display device 13 (step S109), and the entire processing is completed. When the result of decoding is not "0" (No in step S108), the generation unit 12 displays, on the display device 13, information indicating a suspected component obtained by matching the result of decoding with the suspected-fault dictionary information 140 stored in the storage unit 14 (step S110), and the entire processing is completed.

The fault content identification device 10 according to the present example embodiment is able to identify, in a short time, details of a fault of the power supply control system with respect to the processing of turning a device on or off. This is because, while the power supply control processing for turning on or off the power supply device 30 is in progress, the detection unit 11 detects that the power supply sequence signal has transitioned to a value indicating non-conformance to the power specifications, and the generation unit 12 generates information indicating details of the power supply control processing performed at the timing at which the power supply sequence signal has transitioned to the value indicating non-conformance to the power specifications.

An effect achieved by the fault content identification device 10 according to the present example embodiment will be described in detail below.

When a hardware fault occurs upon turning an information processing apparatus on or off, the hardware or software often can not generate a log indicating a cause of the fault. In such a case, in order to identify the cause of the fault, it is commonly practiced to analyze details of the fault by connecting a physical wiring to a printed circuit board in such a way that the power supply sequence signal, for example, is able to be observed and subsequently observing, using an observational instrument such as a logic analyzer, the power supply sequence signal or the like. In this case, repeated confirmation is required by replacing a suspected component for the fault and reproducing the fault; in addition, since reproduction of a fault often depends on an environment or a configuration of the information processing system, there is a problem in that identification of a faulty component requires a lot of time.

In order to solve such a problem, in the fault content identification device 10 according to the present example embodiment, the detection unit 11 detects, while the power supply control processing for turning on or off the power supply device 30 that supplies power to the main device 20 is in progress, that a value indicated by the power supply sequence signal, which is generated by the main device 20 or the power supply device 30 and has a value that transitions in accordance with the prescribed specification, has transitioned to a value indicating non-conformance to the prescribed power specifications. The generation unit 12 then generates information indicating details of the power supply control processing performed at the timing at which the detection unit 11 detects that the value indicated by the power supply sequence signal has transitioned to the value indicating non-conformance to the power specifications. With this operation, the user need not perform confirmation by reproducing the aforementioned fault; consequently, the fault content identification device 10 according to the present example embodiment is able to identify, in a short time, details of the fault of the power supply control system with respect to the processing of turning the device on or off.

The fault content identification device 10 according to the present example embodiment further includes the storage unit 14 storing the suspected-fault dictionary information 140. The suspected-fault dictionary information 140 is information that associates the details of the power supply control processing with the fault-suspected component in the main device 20 or the power supply device 30. The generation unit 12 obtains, by matching the information indicating details of the power supply control processing performed at the timing at which it is detected that the value indicated by the power supply sequence signal has transitioned to a value indicating non-conformance to the power specifications with the suspected-fault dictionary information 140, information indicating the fault-suspected component associated with the details of the power supply control processing, and displays the obtained information indicating the fault-suspected component, for example, on the display device 13. Generally speaking, with the current search technology, even in a relatively large system configuration, a time required to search for a fault-suspected component using such suspected-fault dictionary information is, for example, of the order of milliseconds or less. Accordingly, for a fault already registered in the suspected-fault dictionary information, the user need not perform confirmation by reproducing the fault. With this operation, the fault content identification device 10 according to the present example embodiment is able to present information indicating the fault-suspected component based on the details of the fault of the power supply control system that has occurred to the user in a short time. Thus, the fault content identification device 10 avoids a situation in which the user repeats confirmation by reproducing the fault the details of which are the same; consequently, a burden on the user is able to be reduced.

The fault content identification device 10 according to the present example embodiment may not include a storage unit 14. In this case, the decode circuit 120 in the generation unit 12 displays the decoded numerical value directly on the display device 13. The display device 13 in this case may be any device as long as it is a simple device capable of displaying a numerical value, for example, a seven-segment LED (Light Emitting Diode) display. In this case, the user can understand, from the numerical value displayed on the display device 13, the details of the power supply control processing performed at the timing at which it is detected that the value indicated by the power supply sequence signal has transitioned to the value indicating non-conformance to the power specifications. Therefore, in this case, the fault content identification device 10 according to the present example embodiment is able to present an identification result of the details of the fault of the power supply control system with respect to the processing of turning the device on or off to the user by means of a simple configuration.

The detection unit 11 and the generation unit 12 according to the present example embodiment is constructed with a programmable logic circuit, for example, a PLD. In this manner, for example, when a specification for generating a power supply sequence signal is changed, the fault content identification device 10 according to the present example embodiment is able to flexibly respond to the change.

The configurations of the detection unit 11 and the generation unit 12 according to the present example embodiment are not limited to the configuration including the comparison circuits 110 to 114, the FFs 115 to 119, and the decode circuit 120. For example, when the value of the power supply sequence signal generated by the main device 20 or the power supply device 30 transitions in a more complex manner compared with those in the timing diagram exemplified in FIG. 2, the detection unit 11 and the generation unit 12 may include a logical configuration that is able to perform the aforementioned processing according to the power supply sequence signal that transitions in a complex manner. As a technique for designing such a logical configuration, a currently common technique may be employed.

Second Example Embodiment

Figure 7:
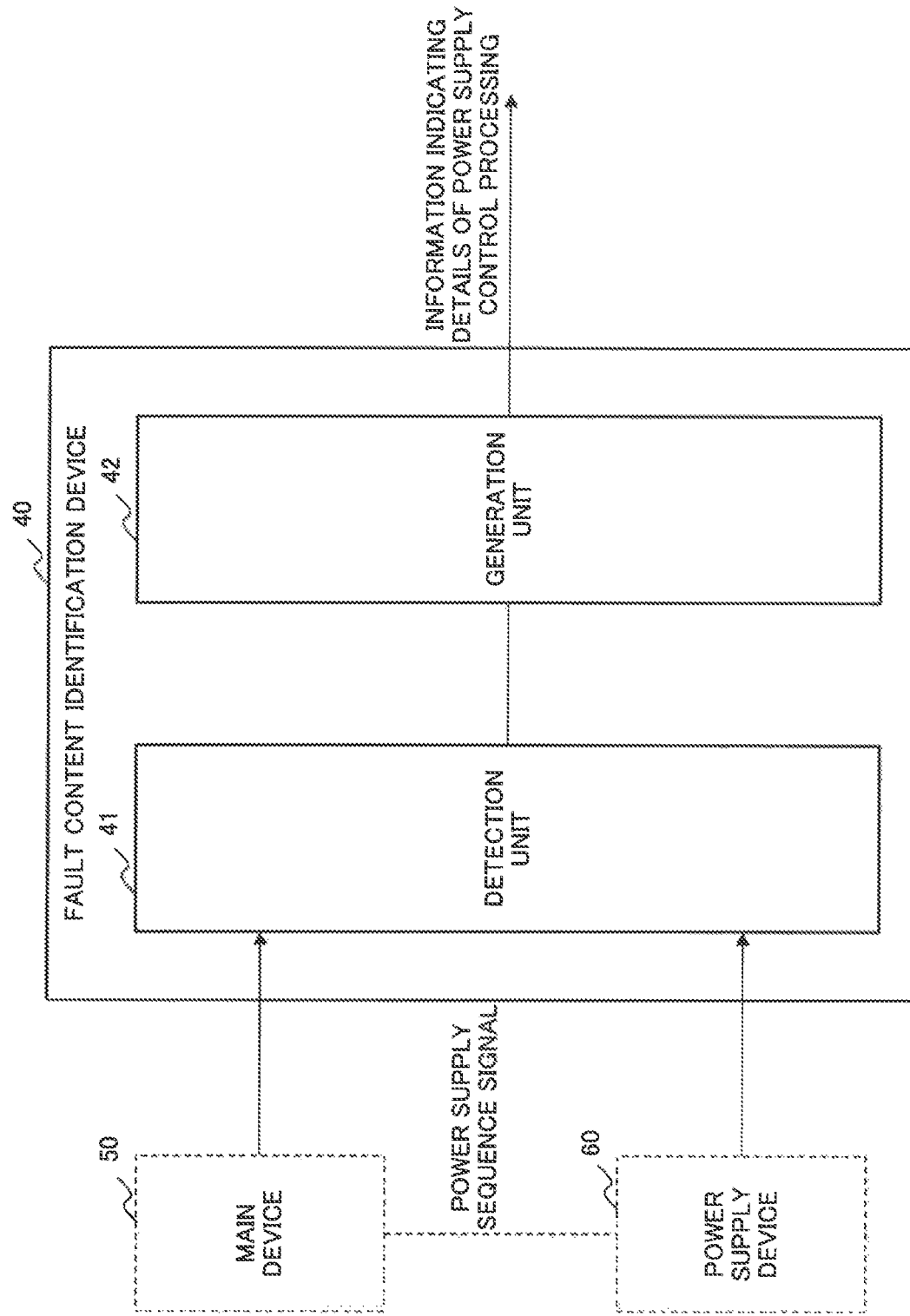
FIG. 7 is a block diagram illustrating a configuration of a fault content identification device 10 according to a second example embodiment of the present invention.

FIG. 7 is a block diagram conceptually illustrating a configuration of a fault content identification device 40 according to a second example embodiment of the present invention. The fault content identification device 40 includes a detection unit 41 and a generation unit 42.

While the power supply control processing for turning on or off a power supply device 60 that supplies power to a main device 50 is in progress, the main device 50 or the power supply device 60 generates a power supply sequence signal having a value that transitions in accordance with a prescribed specification. The detection unit 41 detects that a value indicated by the power supply sequence signal has transitioned to a value indicating non-conformance to the prescribed specification.

The generation unit 42 generates, by means of the detection unit 41, information indicating details of the power supply control processing performed at a timing at which it is detected that the value indicated by the power supply sequence signal has transitioned to the value indicating non-conformance to the prescribed specification.

The fault content identification device 40 according to the present example embodiment is able to identify, in a short time, details of a fault of the power supply control system with respect to a processing of turning a device on or off. This is because, while the power supply control processing for turning on or off the power supply device 60 is in progress, the detection unit 41 detects that the power supply sequence signal has transitioned to the value indicating non-conformance to the prescribed specification, and the generation unit 42 generates information indicating the details of the power supply control processing performed at the timing at which the power supply sequence signal has transitioned to the value indicating non-conformance to the prescribed specification.

<An Example of a Hardware Configuration>

In each of the aforementioned example embodiments, each unit in the fault content identification devices illustrated in FIG. 1 and FIG. 7 may be achieved by dedicated HW (HardWare) (an electronic circuit). In FIG. 1 and FIG. 7, at least the following components may be considered as a functional (processing) unit (software module) of a software program:

detection units 11 and 41; and
generation units 12 and 42.

Note that divisions among units illustrated in these drawings illustrate configurations for the sake of convenience; in implementation, various configurations may be assumed. An example of a hardware environment in this case will be described with reference to FIG. 8.

FIG. 8 is a diagram illustrating, in an exemplifying manner, a configuration of an information processing apparatus 900 (computer) that may implement the fault content identification device according to each example embodiment of the present invention. In other words, FIG. 8 illustrates a configuration of a computer (information processing apparatus) that may achieve the fault content identification devices illustrated in FIG. 1 and FIG. 7, which is a hardware environment that may achieve functions of the aforementioned example embodiments.

The information processing apparatus 900 illustrated in FIG. 8 includes, as components, the following:

CPU (Central_Processing_Unit) 901;
ROM (Read_Only_Memory) 902;
RAM (Random_Access_Memory) 903;
hard disk (storage device) 904;
communication interface 905 for an external device;
bus 906 (communication line);
reader/writer 908 that can read/write data stored in a recording medium 907 such as a CD-ROM (Compact_Disc_Read_Only_Memory); and
input/output interface 909.

In other words, the information processing apparatus 900 including the aforementioned components is a general computer connected to these components via a bus 906. The information processing apparatus 900 may include a plurality of CPUs 901 or may include a CPU 901 including multiple cores.

The present invention described by means of the aforementioned example embodiments as examples provides a computer program that may achieve functions below to the information processing apparatus 900 illustrated in FIG. 8. The functions are the functions of the aforementioned configurations in the block configuration diagrams (FIG. 1 and FIG. 7) that have been referred to in description of the example embodiments or the functions illustrated in the flowchart (FIG. 6). The present invention may be achieved by subsequently reading out the computer program into the CPU 901 of the hardware and interpreting and executing the computer program. The computer program supplied in the device may be stored in a volatile readable/writable memory (RAM 903) or a non-volatile storage device such as a ROM 902 or a hard disk 904.

In the aforementioned case, as a method of supplying the computer program in the hardware, a currently commonly used procedure may be adopted. The procedure includes, for example, a method of installing the computer program in the device via various types of recording media 907 such as a CD-ROM and a method of downloading the computer program from outside via a communication line such as the Internet. In such a case, the present invention may be considered that it is constructed with codes for configuring the computer program according to the present invention or the recording medium 907 storing the codes.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-143478, filed on Jul. 21, 2016, the disclosure of which is incorporated herein in its entirety by reference.

REFERENCE SIGNS LIST

10 fault content identification device
11 detection unit
110 to 114 comparison circuit
1100 and 1101 NOT gate
1102 to 1105 AND gate
1106 OR gate
115 to 119 FF
12 generation unit
120 decode circuit
13 display device
14 storage unit
140 suspected-fault dictionary information
20 main device
30 power supply device
40 fault content identification device
41 detection unit
42 generation unit
50 main device
60 power supply device
900 information processing apparatus
901 CPU
902 ROM
903 RAM
904 hard disk (storage device)
905 communication interface
906 bus
907 recording medium
908 reader/writer
909 input/output interface

What is claimed is:

1. A fault content identification device, comprising:
at least one memory storing computer program; and
at least one processor configured to execute the computer program to:
determine fault in a power supply control processing by detecting, while the power supply control processing for turning on or off a power supply device that supplies power to a main device is in progress, that a value indicated by more than two power supply sequence signals generated by the main device or the power supply device and having a value that transitions in accordance with a prescribed specification, transitions to a value indicating non-conformance to the prescribed specification; and
generate information indicating details of the power supply control processing performed at a timing of detecting that the value indicated by the power supply sequence signals transitions to the value indicating non-conformance to the prescribed specification.

2. The fault content identification device according to claim 1, wherein the processor is configured to execute the computer program to:
while the power supply control processing in which a plurality of partial processing are performed in sequence is in progress, when the value indicated by the power supply sequence signals in each of the partial processing is individually updated, detect values, each of which being sequentially updated in two of the partial processing, indicated by two of the power supply sequence signals, are updated in such a way that the two values do not conform to the prescribed specification, and
when detecting that the values indicated by the two power supply sequence signals are updated in such a way that the values do not conform to the prescribed specification, generate as the information indicating the details of the power supply control processing, information indicating the two partial processing in which the values indicated by the two power supply sequence signals are updated.

3. The fault content identification device according to claim 2, wherein the processor is configured to execute the computer program to:
detect, by comparing the values indicated by the two power supply sequence signals, the values indicating that the two partial processing are started or completed, that the values indicated by the two power supply sequence signals are updated in such a way that the values do not conform to the prescribed specification.

4. The fault content identification device according to claim 3, wherein the processor is configured to execute the computer program to compare the values indicated by the two power supply sequence signals at a timing when it is detected the values are updated in such a way that the values do not conform to the prescribed specification, keep a result value of the comparison after the timing of the detection, and generate, by decoding the comparison result value with respect to a plurality of the two partial processing sequentially arranged, the information indicating the details of the power supply control processing.

5. The fault content identification device according to claim 1, wherein the processor is configured to execute the computer program to display the generated information indicating the details of the power supply control processing on a display device.

6. The fault content identification device according to claim 5, wherein the display device includes an LED capable of displaying a character.

7. The fault content identification device according to claim 1, further comprising:

a storage configured to store suspected-fault dictionary information that associates the details of the power supply control processing with a fault-suspected component in the main device or the power supply device, wherein the processor is configured to execute the computer program to output, by matching the generated information indicating the details of the power supply control processing with the suspected-fault dictionary information, information indicating the fault-suspected component associated with the details of the power supply control processing to the outside.

8. The fault content identification device according to claim 1, wherein the processor is constructed with a programmable logic circuit.

9. A fault content identification method implemented by an information processing apparatus, comprising:

determining fault in a power supply control processing detecting, while the power supply control processing for turning on or off a power supply device that supplies power to a main device is in progress, that a value indicated by more than two power supply sequence signals generated by the main device or the power supply device and having a value that transitions in accordance with a prescribed specification, transitions to a value indicating non-conformance to the prescribed specification; and generating information indicating details of the power supply control processing performed at a timing at which it is detected that the value indicated by the power supply sequence signals transitions to the value indicating non-conformance to the prescribed specification.

10. A non-transitory computer-readable recording medium storing a fault content identification program for causing a computer to execute:

a determination processing of determining fault in a power supply control processing by detecting, while the power supply control processing for turning on or off a power supply device that supplies power to a main device is in progress, that a value indicated by more than two power supply sequence signals generated by the main device or the power supply device and having a value that transitions in accordance with a prescribed specification, transitions to a value indicating non-conformance to the prescribed specification; and a generation processing of generating information indicating details of the power supply control processing performed at a timing of detecting that the value indicated by the power supply sequence signal transitions to the value indicating non-conformance to the prescribed specification.

* * * * *